United States Patent
Roh et al.

(10) Patent No.: US 7,151,853 B2
(45) Date of Patent: Dec. 19, 2006

(54) HAND/EYE CALIBRATION METHOD USING PROJECTIVE INVARIANT SHAPE DESCRIPTOR OF 2-DIMENSIONAL IMAGE

(75) Inventors: Kyoung-sig Roh, Kyungki-do (KR); Young Son, Kyungki-do (KR); Joo-young Kwak, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/300,435

(22) Filed: Dec. 15, 2005

(65) Prior Publication Data

US 2006/0095226 A1    May 4, 2006

Related U.S. Application Data

(62) Division of application No. 10/706,936, filed on Nov. 14, 2003, now Pat. No. 7,019,825.

(30) Foreign Application Priority Data

Nov. 21, 2002 (KR) ............................. 2002-72695

(51) Int. Cl.
  *G06K 9/46* (2006.01)
  *G06K 9/48* (2006.01)
(52) U.S. Cl. ....................... 382/195; 382/199
(58) Field of Classification Search ........ 382/152–153, 382/190, 195, 199, 201, 203, 209, 286; 358/504; 702/127, 151
See application file for complete search history.

(56) References Cited

U.S. PATENT DOCUMENTS 5,227,985 A    7/1993    DeMenthon
5,550,376 A    8/1996    Gupta et al.

OTHER PUBLICATIONS

Flusser "Invariant shape description and measure of object similarity", IEEE, pp. 139-142, 1992.*

* cited by examiner

*Primary Examiner*—Daniel Mariam
(74) *Attorney, Agent, or Firm*—Buchanan Ingersoll & Rooney PC (57) ABSTRACT

Provided is a hand/eye calibration method by using a projective invariant shape descriptor of a two-dimensional image. The method includes calculating a projective invariant shape descriptor of a two-dimensional image from at least two images obtained by a camera mounted on a robot hand, at a predetermined time interval, extracting corresponding points between the images by using the projective invariant shape descriptor, calculating a rotation matrix for the corresponding points from translation of the robot hand, calculating translation vector for the corresponding points from translation and rotation of the robot hand, and finding a relation between the robot hand and the camera based on the rotation matrix and the translation vector.

4 Claims, 7 Drawing Sheets

HAND/EYE CALIBRATION METHOD USING PROJECTIVE INVARIANT SHAPE DESCRIPTOR OF 2-DIMENSIONAL IMAGE

BACKGROUND OF THE INVENTION

This application is a divisional and claims the benefit of the priority of prior application Ser. No. 10/706,936, filed Nov. 14, 2003, entitled "Hand/eye calibration method using projective invariant shape descriptor of 2-dimensional image", which is now U.S. Pat. No. 7,019,825 issued on Mar. 28, 2006.

1. Field of the Invention

The present invention relates to visual servoing technology, and more particularly, to a hand/eye calibration method using a projective invariant shape descriptor of a two-dimensional image.

2. Description of the Related Art

Hand/eye calibration denotes a procedure for determining the spatial transformation between a robot hand and a camera mounted on the robot hand to obtain a desired image using visual servoing technology in a robot's coordinate frame and control the robot. One of the hand/eye calibration methods, which is most frequently used, is to provide a prior motion information and to obtain desired information from images transforms generated based on the provided motion information. In order to easily and correctly extract transformation information of the robot hand, it is very important to correctly select corresponding points between transformed images in this method.

SUMMARY OF THE INVENTION

The present invention provides a hand/eye calibration method which makes it possible to easily and correctly extract transformation information between a robot hand and a camera.

The present invention also provides a computer readable medium having embodied thereon a computer program for the hand/eye calibration method.

According to an aspect of the present invention, there is provided a hand/eye calibration method. The method includes (a) calculating a projective invariant shape descriptor from at least two images consecutively obtained through a camera mounted on a robot hand; (b) extracting corresponding points between the images by using the projective invariant shape descriptor; (c) calculating a rotation matrix for the corresponding points from translation of the robot; (d) calculating translation vector for the corresponding points from translation and rotation of the robot; and (e) finding a relation between the robot hand and the camera based on the rotation matrix calculated in step (c) and the translation vector calculated in step (d).

According to an aspect of the present invention, there is provided a method of extracting corresponding points between images. The method includes (a) defining errors for a projective invariant shape descriptor for a two-dimensional image from at least two images obtained at a predetermined interval and calculating noisy invariance; (b) calculating a threshold to be used to set corresponding points according to the noisy invariance; (c) extracting boundary data from the images and presenting the extracted boundary data by sub-sampling N data; (d) minimizing the projective invariant shape descriptor; (e) transforming a following image into the following image according to the minimized projective invariant shape descriptor; (f) resetting distance between boundary data in consideration of the ratio of distance between boundary data before the transformation to distance between boundary data after the transformation; and (g) finding similarities between the boundary data and extracting corresponding points between the previous images and the following image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown. In the drawings, like reference numerals refer to like elements throughout.

Figure 1:
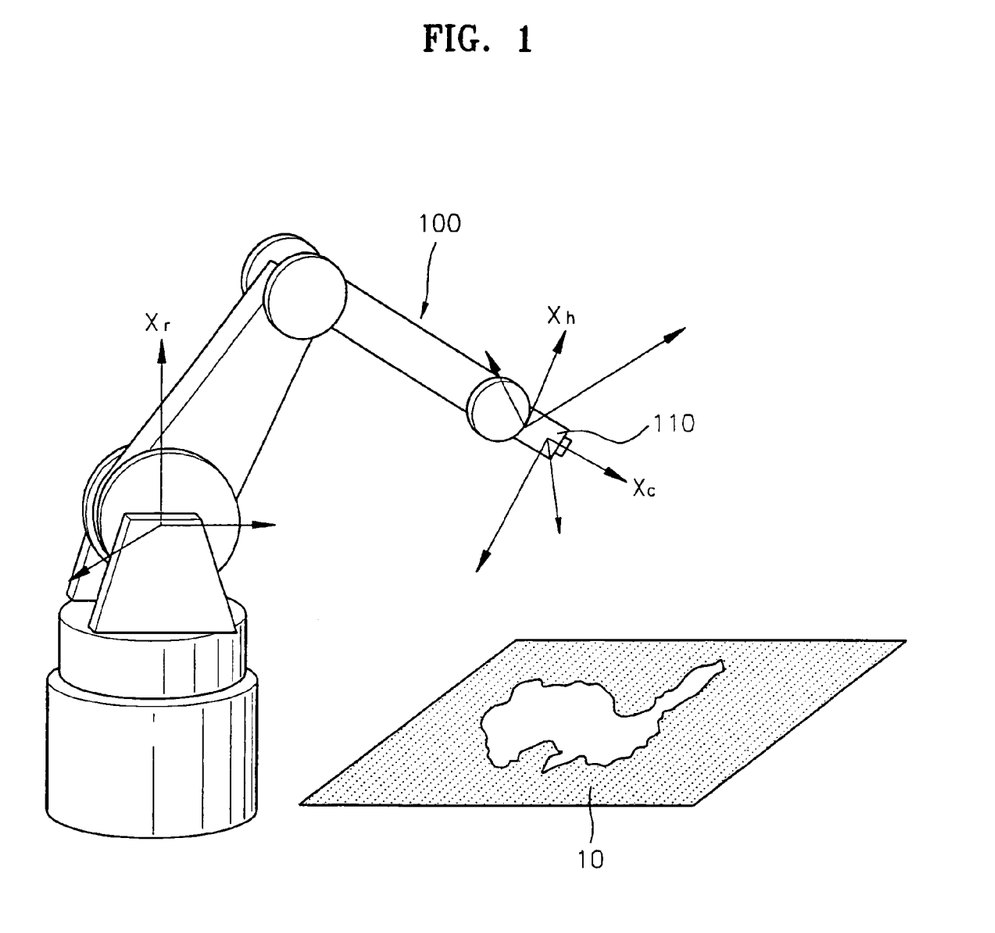
FIG. 1 is a view of a robot hand on which a camera is mounted, the robot hand being controlled using visual servoing.

FIG. 1 is a view of a robot hand 100 on which a charged-coupled device (CCD) camera 110 is mounted to adopt a visual servoing controlling technique. Referring to FIG. 1, at least one CCD camera 110 is mounted at an end of the robot hand 100 used as an industrial robot.

Figure 2:
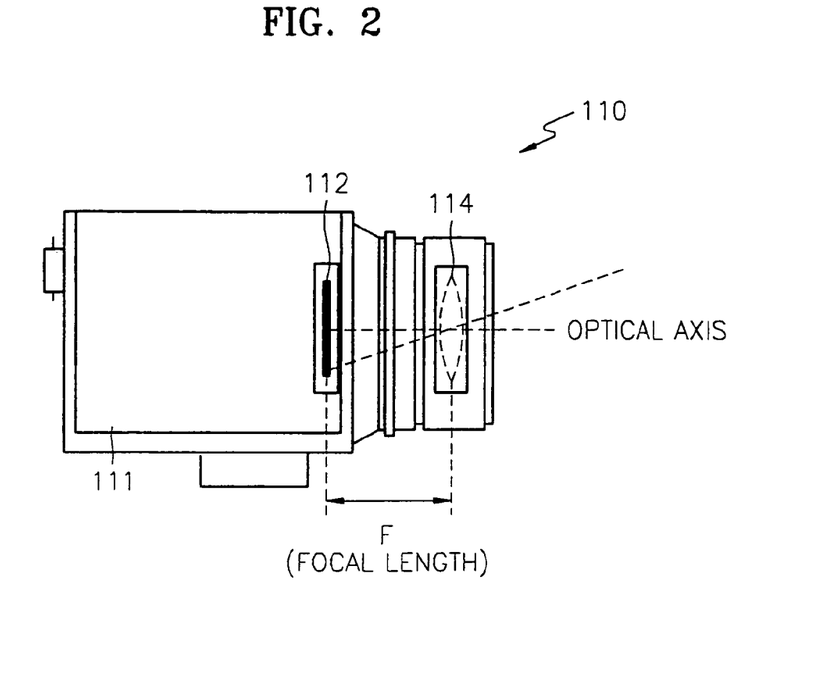
FIG. 2 is a view of an appearance of the camera of FIG. 1.

FIG. 2 is a view of an appearance of the CCD camera 110 of FIG. 1. Referring to FIG. 2, the CCD camera 110 is composed of a main body 111, a CCD array 112, and a lens 114. The lens 114 has the same function as that of a crystalline lens of a person's eyes. The CCD array 112 corresponds to an image plane on which an image projected through the lens 114 of the CCD camera 110 is cast and has the same function as that of the retina of a person's eyes. When a focus of the lens 114 is set to infinitely, the length from a center of the lens 114 to the CCD array 112 denotes a focal length F, and the image looks different according to the focal length F. The focal length F is an important parameter necessary to estimate the length between the CCD camera 110 and an object.

Figure 3:
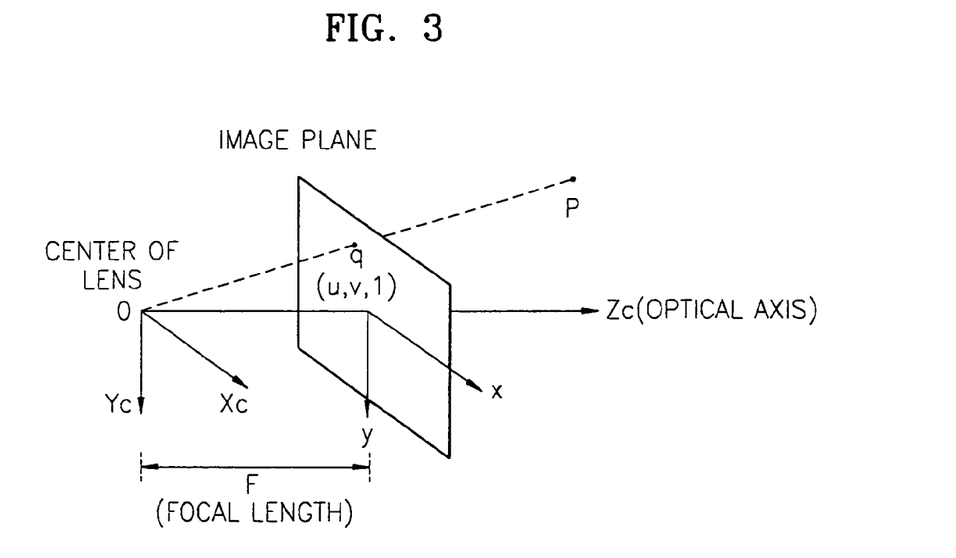
FIG. 3 is a view of a pin-hall camera model of the camera of FIG. 2.
Figure 4:
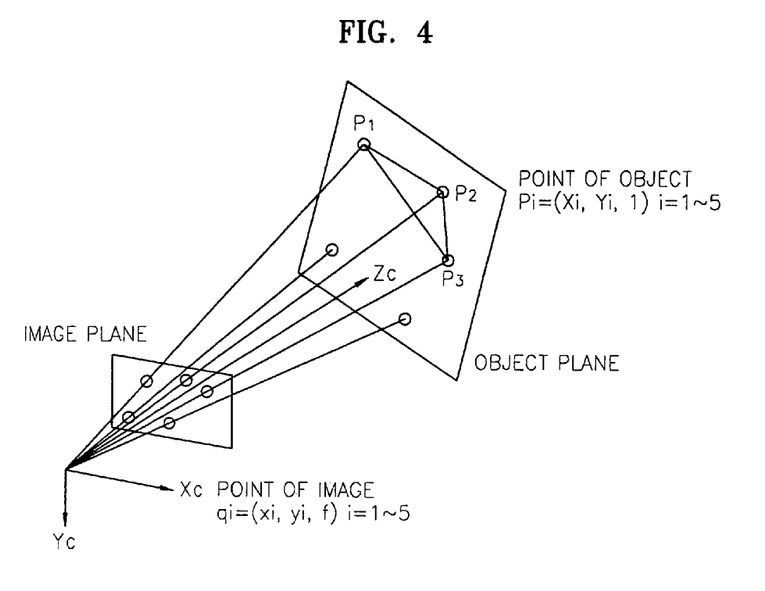
FIG. 4 is a view of coordinate systems of an object plane and an image plane, and a projection result of the image plane to the object plane.

FIG. 3 is a view of a pin-hall camera model of the CCD camera 110 of FIG. 2, and FIG. 4 is a view of coordinate systems of an object plane and an image plane, and a projection result of the image plane to the object plane. Referring to FIGS. 3 and 4, a projective transformation for an image in the pin-hall camera model can be expressed as follows.

$$\begin{bmatrix} u \\ v \\ 1 \end{bmatrix} = \frac{1}{t_{31}X + t_{32}Y + t_{33}Z + t_{34}} \begin{bmatrix} t_{11} & t_{12} & t_{13} & t_{14} \\ t_{21} & t_{22} & t_{23} & t_{24} \\ t_{31} & t_{32} & t_{33} & t_{34} \end{bmatrix} \begin{bmatrix} X \\ Y \\ Z \\ 1 \end{bmatrix} \quad (1)$$

where (u, v, 1) denotes a coordinates of a point q defined on the image plane, (X, Y, Z, 1) denotes a coordinates of a point P in an object coordinate system, and $t_{ij}$ denotes an ij factor of a transformation matrix between an object plane and the image plane.

Here, if an object is projected to on a two-dimensional plane, i.e., Z=0, Equitation 1 is transformed as follows.

$$\begin{bmatrix} u \\ v \\ 1 \end{bmatrix} = \frac{1}{t_{31}X + t_{32}Y + t_{34}} \begin{bmatrix} t_{11} & t_{12} & t_{14} \\ t_{21} & t_{22} & t_{24} \\ t_{31} & t_{32} & t_{34} \end{bmatrix} \begin{bmatrix} X \\ Y \\ 1 \end{bmatrix} \quad (2)$$

As shown in Equations 1 and 2, the process for obtaining an image is performed in non-linear environment. However, a linearized projective transformation is adopted to a two-dimensional image obtained through the CCD camera 110 rather than a non-linear projective transformation like in Equation 2.

Figure 5:
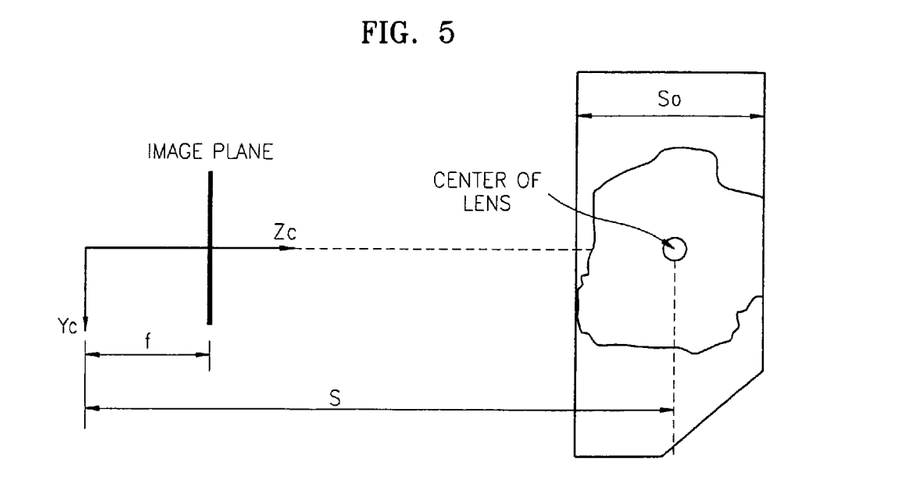
FIG. 5 is a view showing conditions to satisfy a linearity of the camera of FIG. 2.

FIG. 5 is a view showing conditions to obtain a linear model of the CCD camera 110 of FIG. 2. As shown in FIG. 5, if a length S from the CCD camera 110 to the object is sufficiently longer than a size $S_0$ of the object, the non-linear projective transformation from like Equation 2 is transformed as follows.

$$\begin{bmatrix} u \\ v \\ 1 \end{bmatrix} \approx S \begin{bmatrix} t_{11} & t_{12} & t_{14} \\ t_{21} & t_{22} & t_{24} \\ t_{31} & t_{32} & t_{34} \end{bmatrix} \begin{bmatrix} X \\ Y \\ 1 \end{bmatrix} \quad (3)$$

A Fourier descriptor is a linearized shape descriptor which satisfies Equations 1, 2, and 3. The Fourier descriptor represents an image of the object with Fourier coefficients which are obtained by a two-dimensional Fourier transformation for the image contour of a two-dimensional object. However, this method can be applied only to a case where linearity of a camera is guaranteed, that is, where a distance between the CCD camera 110 and the object is too long. Therefore, to overcome the restriction, the image obtained from the CCD camera 110 is analyzed by using a projective invariant shape descriptor I in the present invention. As a result, even in a case where the linearity of the camera is not guaranteed, that is, the distance between the CCD camera 110 and the object is not long, the image can be analyzed correctly without being affected by noise, slant angles, or the nonlinearity of the CCD camera 110 occurring when images are obtained.

Figure 6:
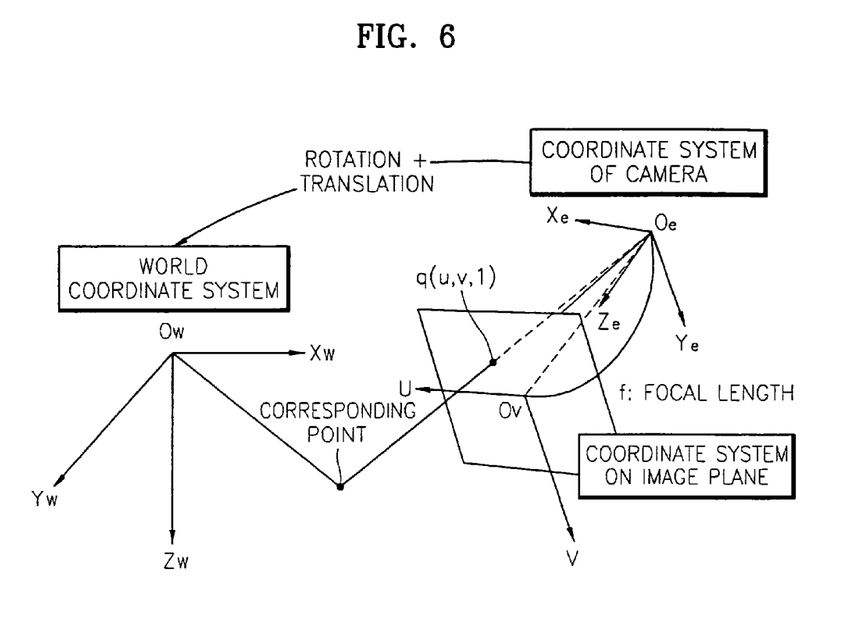
FIG. 6 is a view presenting a relationship for a coordinate system of an object plane, a coordinate system on an image plane, and a world coordinate system of a robot hand.

FIG. 6 is a view presenting a relationship for a coordinate system of an object plane, a coordinate system on an image plane, and a world coordinate system of a robot hand. Referring to FIG. 6, a coordinate system of the CCD camera 110 corresponds to a world coordinate system of the robot hand 100 after a rotation and a translation. Thus, a robot hand/eye calibration is a process of finding the elements, a rotation matrix R, which gives a direction of the CCD camera 110, and components of a translation vector t, which gives a location of the CCD camera 110, in the world coordinate system.

In the hand/eye calibration method according to the present invention, the pin-hall camera model is used in which distortion of the lens 114 or misalignment of a light axis can be ignored. The relations between the robot hand 100 of FIG. 6 and the CCD camera 110 can be expressed as follows, $$X_h = RX_c + t \quad (4)$$

where $X_h$ denotes the world coordinate system of the robot hand 100, i.e., $X_c$ denotes a coordinate system of the CCD camera 110, R denotes a rotation matrix, and t denotes a translation vector.

The relation between the CCD camera 110 and the image can be expressed as follows.

$$(u - u_0) = \frac{f}{S_x} \frac{x_c}{z_c}, \quad (v - v_0) = \frac{f}{S_y} \frac{y_c}{z_c} \quad (5)$$

where, u and $u_0$ denote X coordinates on an image plane, and v and $v_0$ denote Y coordinates on an image plane. In addition, f denotes a focal length between the lens 114 and the CCD array 112, and $S_x$ and $S_y$ denote scale factors of the CCD camera 110. The focal length f and scale factors $S_x$ and $S_y$ are characteristic values which indicate original characteristics of the CCD camera 110 and they are fixed according to a specification of the CCD camera 110.

If robot motion information already known to the user $X_{p1} = R_{p1} X_{p2} + t_{p1}$ is introduced in Equation 4, the following Equation is obtained.

$$RX_{c1} + t = R_{p1}(RX_{c2} + t) + t_{p1} \quad (6)$$

The motion of the CCD camera 110 $X_{c1}$ can be expressed as follows by using Equation 6.

$$X_{c1} = \underbrace{\frac{(R^{-1}R_{p1}R)}{R_{c1}}}_{} X_{c2} + \underbrace{\frac{R^{-1}(R_{p1}t + t_{p1} - t)}{t_{c1}}}_{} \quad (7)$$

If the rotation matrix is excluded from Equation 7 and only translation is considered, the rotation matrix R can be expressed as follows.

$$t_{c1} = R^{-1} t_{p1} \quad (8)$$

Equation 8 can be expressed by substituting $t_{p1}$ with three motion vectors of the robot, $t_{p1}$, $t_{p2}$, and $t_{p3}$ as follows.

$$(t_{c1}, t_{c2}, t_{c3}) = R^{-1}(t_{p1}, t_{p2}, t_{p3}) \quad (9)$$

Here, image vectors corresponding to three motion vectors of the robot hand, $t_{p1}$, $t_{p2}$, and $t_{p3}$ are $OF_1$, $OF_2$, and $OF_3$, and each image vector is defined by the following Equation 10, $$OF_i = f\left[\frac{(u_i - u_0)}{f_x}, \frac{(v_i - v_0)}{f_y}, 1\right] \qquad (10)$$

where $$f_x = \frac{f}{S_x}, \text{ and } f_y = \frac{f}{S_y}.$$

Intrinsic parameters can be calculated as follows.

$$[OF_1 \cdot OF_2 = 0] \qquad (11)$$
$$\frac{1}{f_x^2}(u_1 - u_0)(u_2 - u_0) + \frac{1}{f_y^2}(v_1 - v_0)(v_2 - v_0) + 1 = 0$$

$$[OF_1 \cdot OF_3 = 0]$$
$$\frac{1}{f_x^2}(u_1 - u_0)(u_3 - u_0) + \frac{1}{f_y^2}(v_1 - v_0)(v_3 - v_0) + 1 = 0$$

$$[OF_2 \cdot OF_3 = 0]$$
$$\frac{1}{f_x^2}(u_2 - u_0)(u_3 - u_0) + \frac{1}{f_y^2}(v_2 - v_0)(v_3 - v_0) + 1 = 0$$

Equation 11 can be expressed as follows, $$u_0(u_2-u_3)+s_1(v_2-v_3)-s_2v_1(v_2-v_3)=u_1(u_2-u_3)$$

$$u_0(u_1-u_3)+s_1(v_1-v_3)-s_2v_2(v_1-v_3)=u_2(u_1-u_3) \qquad (12)$$

where $$s_1 = v_0\frac{f_x^2}{f_y^2}, \text{ and } s_2 = \frac{f_x^2}{f_y^2}.$$

Equation 12 can be expressed in a matrix form as follows.

$$\begin{bmatrix}(u_2-u_3) & (v_2-v_3) & -v_1(v_2-v_3)\\(u_1-u_3) & (v_1-v_3) & -v_2(v_1-v_3)\\(u_2'-u_3') & (v_2'-v_3') & -v_1'(v_2'-v_3')\\(u_1'-u_3') & (v_1'-v_3') & -v_2'(v_1'-v_3')\end{bmatrix}\begin{bmatrix}u_0\\s_1\\s_2\end{bmatrix}=\begin{bmatrix}u_1(u_2-u_3)\\u_2(u_1-u_3)\\u_1'(u_2'-u_3')\\u_2'(u_1'-u_3')\end{bmatrix} \qquad (13)$$

In consideration of rotation and translation of the robot hand 100, the translation vector t between the robot hand 100 and the CCD camera 110 can be expressed as follows, $$t_{c1}=R^{-1}(R_{p1}t+t_{p1}-t)$$

$$t=(R_{p1}-I)^{-1}(Rt_{c1}-t_{p1}) \qquad (14)$$

where ($R_{p1}$, $t_{p1}$) denotes motion information already known by the user, and R denotes a rotation matrix which is calculated from three rotations of the robot hand 100. $t_{c1}$ denotes an image vector, and I denotes a projective invariant shape descriptor calculated from a two-dimensional image. In order to improve the precision of the hand/eye calibration, it is very important to correctly set points corresponding to coordinates which are predetermined within the field of view of the CCD camera 110. Therefore, in the present invention, corresponding points are obtained by the CCD camera 110 by using the projective invariant shape descriptor which does not vary under nonlinear transformation. Then, the corresponding points are used as calibration targets to conduct hand/eye calibration. The projective invariant shape descriptor I, which is used as a fundamental factor of the hand/eye calibration, can be defined as follows.

$$I \equiv \frac{det(q_5q_1q_4)det(q_5q_2q_3)}{det(q_5q_1q_3)det(q_5q_2q_4)} = \frac{det(P_5P_1P_4)det(P_5P_2P_3)}{det(P_5P_1P_3)det(P_5P_2P_4)} \qquad (15)$$

where P denotes points of the object, q denotes corresponding points of the image as shown in FIG. 3. det(·) in Equation 15 can be defined as follows.

$$det(q_1q_2q_3) = f\begin{bmatrix}x_1 & x_2 & x_3\\y_1 & y_2 & y_3\\1 & 1 & 1\end{bmatrix} \qquad (16)$$

$$det(P_1P_2P_3) = f\begin{bmatrix}X_1 & X_2 & X_3\\Y_1 & Y_2 & Y_3\\1 & 1 & 1\end{bmatrix} = 2^k(\text{Area of }\Delta P_1P_2P_3)$$

The projective invariant shape descriptor I expressed in Equations 15 and 16 represents information which does not vary under nonlinear transformation as shown in Equation 2 and does not vary though images obtained by the CCD camera 110 are transformed.

Figure 7:
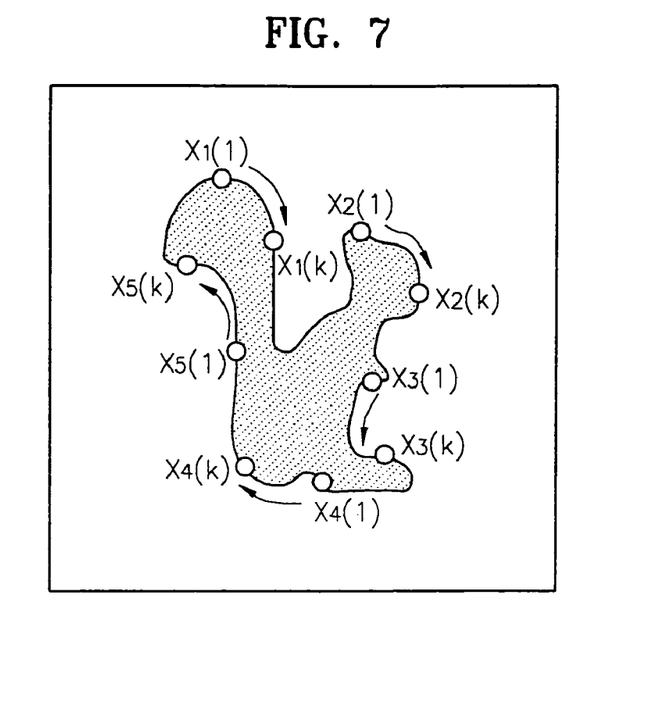
FIG. 7 is a view for explaining a method of obtaining a projective invariant shape descriptor from a 2-dimensional image.

FIG. 7 is a view for explaining a method of obtaining a projective invariant shape descriptor from a 2-dimensional image. Referring to FIG. 7, a contour of the two-dimensional image of a drawing is extracted, and the extracted contour is divided into five similar intervals. Coordinates of points ($X_1(1)$, $X_1(k)$, $X_2(1)$, $X_2(k)$, $X_3(1)$, $X_3(k)$, $X_4(1)$, $X_4(k)$, $X_5(1)$, $X_5(k)$) which constitute each interval are obtained, and then the projective invariant shape descriptor is calculated. The points ($X_1(1)$, $X_1(k)$, $X_2(1)$, $X_2(k)$, $X_3(1)$, $X_3(k)$, $X_4(1)$, $X_4(k)$, $X_5(1)$, $X_5(k)$) are input into Eqation 15 recursively, with moving continuously by 1/N times the length of the contour along the contour until each point reaches its initial location.

$$I(k) = \frac{det(X_5X_1X_4)det(X_5X_2X_3)}{det(X_5X_1X_3)det(X_5X_2X_4)} \qquad (17)$$

where $X_1(k)=(X(k), Y(k),1)$, $$X_2(k) = \left(X\left(\frac{N}{5}+k\right), Y\left(\frac{N}{5}+k\right), 1\right),$$

$$X_2(k) = \left(X\left(\frac{N}{5}+k\right), Y\left(\frac{N}{5}+k\right), 1\right),$$

$$X_3(k) = \left(X\left(\frac{2N}{5}+k\right), Y\left(\frac{2N}{5}+k\right), 1\right),$$

$$X_4(k) = \left(X\left(\frac{3N}{5}+k\right), Y\left(\frac{3N}{5}+k\right), 1\right),$$

$$X_5(k) = \left(X\left(\frac{4N}{5}+k\right), Y\left(\frac{4N}{5}+k\right), 1\right),$$

and $1 \leq k \leq N$, and $X(k)$ and $Y(k)$ denotes X and Y axis coordinate function of the contour.

Figure 8:
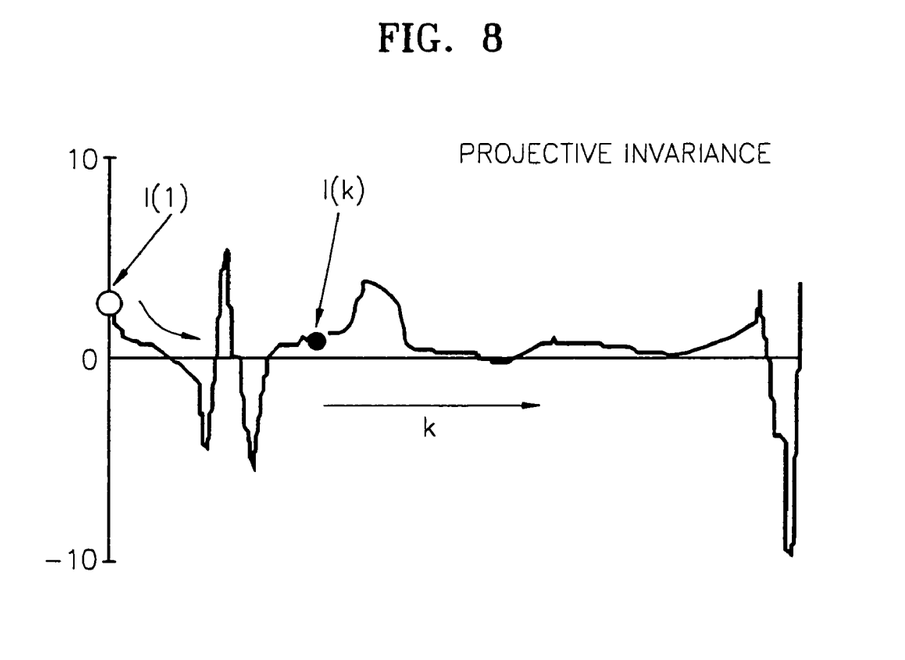
FIG. 8 is a view showing an example of projective invariant shape descriptor calculated from a 2-dimensional shape of FIG. 7.

An example of projective invariant shape descriptor calculated from a 2-dimensional shape of FIG. 7 is shown in FIG. 8. The calculation result of the projective invariant shape descriptor I of FIG. 8, i.e., projective invariant, maintains its intrinsic value though the shape of the image obtained by the CCD camera 110 is transformed. In addition, the projective invariant shape descriptor I is not affected by noise or slant angles. Thus, if the projective invariant is used for the hand/eye calibration, precision of the calibration can be improved.

Corresponding points of the images obtained by the CCD camera 110 by using the projective invariant shape descriptor I can be extracted as follows.

In order to extract corresponding points of the images, errors in the projective invariant shape descriptor I have to be defined. In the present invention, the errors are defined using a Gaussian noise model. In order to use the Gaussian noise model, Equation 17 can be expressed as follows.

$$I = \frac{det(X_5 X_1 X_4) det(X_5 X_2 X_3)}{det(X_5 X_1 X_3) det(X_5 X_2 X_4)} \tag{18}$$

where $X_i = (x_i, y_i, 1)^\tau$ or $I = I(x_1, y_1, x_2, y_2, x_3, y_3, x_4, y_4, x_5, y_5)$.

Here, if $(x_i, y_i)$ is true data, and $(\tilde{x}_i, \tilde{y}_i)$ is a noisy observation parameter, the noise observation parameter can be expressed as follows, $$\tilde{x}_i = x_i + \xi_i, \; \tilde{y}_i = y_i + \eta_i \tag{19}$$

where noise terms $\xi_i$ and $\eta_i$ are distributed noise terms, and their mean and variance are 0 and $\sigma_i^2$. The noise terms can be expressed as follows.

$$E[\xi_i] = E[\eta_i] = 0 \tag{20}$$

$$V[\xi_i] = V[\eta_i] = \sigma_i^2$$

$$E[\xi_i \xi_j] = \begin{cases} \sigma_0^2 & \text{if } i = j \\ 0 & \text{otherwise} \end{cases},$$

$$E[\eta_i \eta_j] = \begin{cases} \sigma_0^2 & \text{if } i = j \\ 0 & \text{otherwise} \end{cases}$$

$$E[\xi_i \eta_j] = 0$$

Noisy invariant can be expressed as follows after noisy measurements on the image are observed.

$$\tilde{I}(\tilde{x}_1, \tilde{y}_1, \tilde{x}_2, \tilde{y}_2, \tilde{x}_3, \tilde{y}_3, \tilde{x}_4, \tilde{y}_4, \tilde{x}_5, \tilde{y}_5) \tag{21}$$

In order to calculate an expected value and a variance of the noisy invariant $\tilde{I}$, the noisy invariant $\tilde{I}$ can be expressed with $(x_1, y_1, x_2, y_2, x_3, y_3, x_4, y_4, x_5, y_5)$ by using Talyor series.

$$\tilde{I} \approx I + \sum_{i=1}^{5} \left[ (\tilde{x}_i - x_i) \frac{\partial \tilde{I}}{\partial \tilde{x}_i} + (\tilde{y}_i - y_i) \frac{\partial \tilde{I}}{\partial \tilde{y}_i} \right] \tag{22}$$

$$= I + \sum_{i=1}^{5} \left[ \xi_i \frac{\partial \tilde{I}}{\partial \tilde{x}_i} + \eta_i \frac{\partial \tilde{I}}{\partial \tilde{y}_i} \right]$$

Here, the variance can be expressed as follows.

$$E[(\tilde{I} - I)^2] = \sigma_0^2 \sum_{i=1}^{5} \left[ \left( \frac{\partial \tilde{I}}{\partial \tilde{x}_i} \right)^2 + \left( \frac{\partial \tilde{I}}{\partial \tilde{y}_i} \right)^2 \right] \tag{23}$$

A threshold of the noisy invariant can be defined as follows.

$$\Delta I = 3 \times \sqrt{E[(\tilde{I} - I)^2]} \tag{24}$$

The corresponding points are found from the images obtained by the CCD camera 110 of the robot hand 100 by repeating calculation of the projective invariant shape descriptor, and boundary data between a previous image and a following image consecutively obtained through the CCD camera 110 can be expressed as follows.

$$O_k^{In} = \{X_{Ik}^{In}, Y_{Ik}^{In}\}, \; k = 1 \sim n^{In}$$

$$O_k^{Mo} = \{X_{Ik}^{Mo}, Y_{Ik}^{Mo}\}, \; k = 1 \sim n^{Mo} \tag{25}$$

where $n^{In}$ and $n^{Mo}$ denote the number of points in a boundary between a scene and a model. The boundary data are presented by subsampling N data, and this subsampling can be expressed as follows.

$$q_i^{In} = \{X_{\tau 1(i)}^{In}, Y_{\tau 1(i)}^{In}\}, q_i^{Mo} = \{X_{\tau 2(i)}^{Mo}, Y_{\tau 2(i)}^{Mo}\},$$
$$i = 1 \sim N \tag{26}$$

where $$\tau_1(i) = \frac{n^{In}}{N} \times i, \; \tau_2(i) = \frac{n^{Mo}}{N} \times i,$$

and N denotes the number of points on a normalized contour.

Then, a projective invariant shape descriptor is calculated by using $q_i^{In}$ and $q_i^{Mo}$ defined in Equation 26 when a value of the following Equation is minimized, $$\varepsilon^2 = \sum_{i=1}^{N} w_i^2 \left( q_i^{In} - (C \cdot q_i^{Mo} + d)^{-1} (A q_i^{Mo} + b) \right)^T \tag{27}$$

$$\left( q_i^{In} - (C \cdot q_i^{Mo} + d)^{-1} (A q_i^{Mo} + b) \right)$$

where A, b, c, and d denote variants defined from transformation between the previous image and the following image and can be expressed as follows.

$$\begin{bmatrix} X_{Ij}^2 \\ Y_{Ij}^2 \\ 1 \end{bmatrix} = (s_7' X_{Ij}^2 + s_8' Y_{Ij}^2 + s_9')^{-1} \left( \begin{bmatrix} s_1 & s_2' \\ s_4' & s_5 \end{bmatrix} \begin{bmatrix} X_{Ij}^1 \\ Y_{Ij}^1 \end{bmatrix} + \begin{bmatrix} s_3' \\ s_6' \end{bmatrix} \right) \tag{28}$$

$$q_i^2 = (C \cdot q_i^1 + d)^{-1} (A q_i^1 + b) \tag{29}$$

The weight $w_i$ of Equation 27 is calculated by the variance defined in Equation 23 as follows.

$$\frac{1}{w_i^2} \equiv \sigma_0^2 = \sum_{i=j}^{5}\left[\left(\frac{\partial \tilde{I}_i}{\partial \tilde{x}_j}\right)^2 + \left(\frac{\partial \tilde{I}_i}{\partial \tilde{y}_j}\right)^2\right] \times E[(\tilde{I}_i - I_i)^2] \quad (30)$$

The projective invariant shape descriptors can be minimized by Equations 27 through 30 as follows.

$$P = (Q^T Q)^{-1} Q^T H \quad (31)$$

Here, $P = (s_1, s_2', s_4', s_5, s_3', s_6', s_7', s_8')^T$, $$Q = \begin{bmatrix} \vdots & \vdots & \vdots & \vdots & \vdots & \vdots & \vdots & \vdots \\ w_i X_{li}^{Mo} & w_i Y_{li}^{Mo} & w_i & 0 & 0 & 0 & w_i X_{li}^{In} X_{li}^{Mo} & w_i X_{li}^{In} Y_{li}^{Mo} \\ 0 & 0 & 0 & w_i X_{li}^{Mo} & w_i Y_{li}^{Mo} & w_i & w_i X_{li}^{In} X_{li}^{Mo} & w_i X_{li}^{In} Y_{li}^{Mo} \\ \vdots & \vdots & \vdots & \vdots & \vdots & \vdots & \vdots & \vdots \end{bmatrix}$$

$$H = (\cdots - w_i X_{li}^{In} - w_i Y_{li}^{In} \cdots)^T$$

After the projective invariant shape descriptors are minimized by using Equation 31, the following image obtained by the CCD camera 110 is transformed into a previous image. This transformation can be expressed as follows.

$$q_i^{Mo'} = (C \cdot q_i^{Mo} + d)^{-1}(A q_i^{Mo} + b), \quad i = 1 \sim N \quad (32)$$

where A, b, c, and d denotes variance defined transformation between the previous image and the following image.

After the transformation between the previous image and the following image is completed, the ratio of the distance between boundary data before the transformation to the distance between boundary data after the transformation, i.e., $_{\tau 2}(i)'$, is calculated by using the following Equation, and then the length between data is reset by using the ratio.

$$\tau_2'(i) = \frac{|q_{i+1}^{Mo'} - q_i^{Mo'}|}{T}, \quad i = 1 \sim N \quad (33)$$

$$T = \sum_{i=1}^{N} |q_{i+1}^{Mo'} - q_i^{Mo'}|$$

By using the ratio $_{\tau 2}(i)'$ calculated by Equation 33, the following image can be resampled as follows.

$$q_i^{In'} = O_{\tau 2(i)}^{In}, \quad i = 1 \sim N \quad (34)$$

After that, in order to include errors between the previous image and the following image within a predetermined scope, Equations 29 through 34 are repeated. The errors are expressed by errors of the corresponding points and similarities between the projective invariant shape descriptors ($I_m$, $I_i$) of the boundary data. A similarity value of the projective invariant shape descriptors ($I_m$, $I_i$) of the boundary data can be expresses as follows.

$$\text{similarity}(I_m, I_i) = \frac{\sum_{k=1}^{N} T(k)}{N} \quad (35)$$

-continued $$T(k) = \begin{cases} 1, & \text{if } |I_m(k) - I_i(k)| < \Delta I \\ 0, & \text{otherwise} \end{cases}$$

If the maximum value of the similarity values is greater than a predetermined threshold, it is determined that the corresponding points of the previous image and the following image are the same as each other. The value of $\Delta I$ in Equation 35 and the predetermined threshold are selected according to an environment to which the present invention is applied and a required precision.

Figure 9:
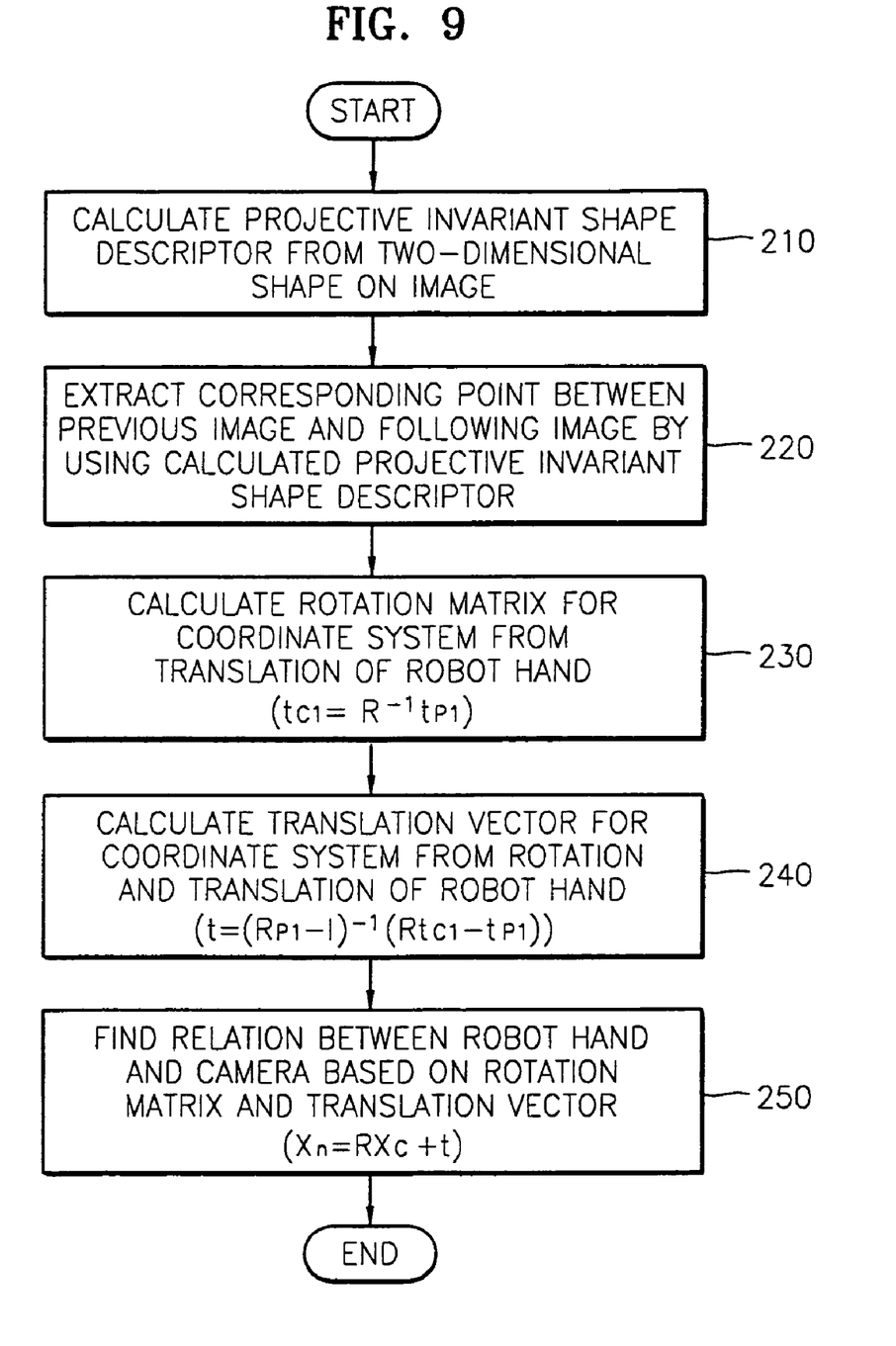
FIG. 9 is a flowchart of a method for hand/eye calibration according to an embodiment of the present invention.

FIG. 9 is a flowchart of a method for hand/eye calibration according to a preferred embodiment of the present invention. Referring to FIG. 9, the hand/eye calibration method according to the present invention includes calculating a projective invariant shape descriptor I from a two-dimensional image (step 210). Then, corresponding points between a previous image and a following image consecutively obtained through the CCD camera 110 are extracted by using the calculated projective invariant shape descriptor I (step 220). The extracted corresponding points are used as targets to perform the hand/eye calibration.

Then, a rotation matrix R for a coordinate, i.e., the extracting corresponding points, is calculated from a translation of the robot hand 100 (step 230). Here, the rotation matrix R is calculated by Equation 8. A translation vector t for the coordinate, i.e., the extracted corresponding points, is calculated from translation and rotation of the robot hand 100 (step 240). Here, the translation vector t is calculated by Equation 14. After completion of steps 230 and 240, the hand/eye calibration which defines a relation between the robot hand 100 and the CCD camera 110, that is, obtains a calculation result of $X_h = RX_c + t$, is completed (step 250). Here, $X_h$ denotes a coordinate system of the robot hand 100, and $X_c$ denotes a coordinate system of the CCD camera 110 mounted on the robot hand 100.

Figure 10:
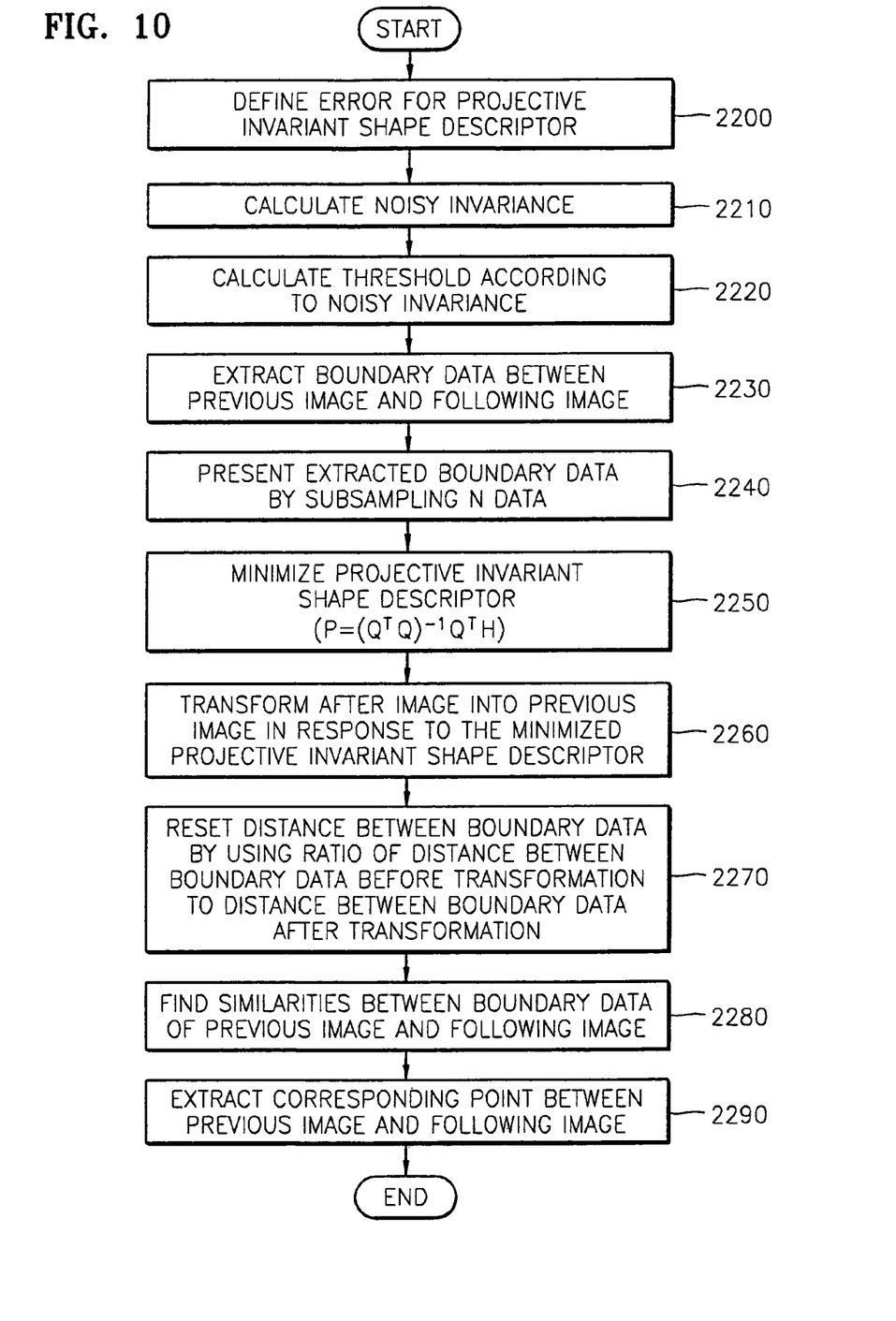
FIG. 10 is a detailed flowchart of a method of obtaining corresponding points between a previous image and a following image shown in FIG. 9.

FIG. 10 is a detailed flowchart of a method of obtaining corresponding points between a previous image and a following image shown in FIG. 9. In general, a calibration target which is finely organized is required to accurately perform the hand/eye calibration. Thus, as shown in FIG. 10 of the present invention, corresponding points of consecutive images obtained by the CCD camera 110 are extracted by using the projective invariant shape descriptor I which is not affected by nonlinearity or noise of the CCD camera 110, and the projective invariant shape descriptor I is used as the calibration target.

In order to accurately perform the hand/eye calibration, errors of the projective invariant shape descriptor I of images are defined (step 2200), and noisy invariant is calculated by analyzing an amount of noises of the images (step 2210). Then, a threshold is calculated according to the noisy invariant calculated in step 2210 (step 2220).

Boundary data of a previous image and a following image obtained by the CCD camera 110 are extracted (step 2230). The extracted boundary data is presented by subsampling N data (step 2240). Then, a projective invariant shape descriptor is minimized in accordance with Equation 31 (step 2250), and the following image is transformed into a previous image in response to the minimized projective invariant shape descriptor (step 2260). After that, the distance between boundary data is reset by using the ratio of the distance between boundary data before the transformation to the distance between boundary data after the transformation (step 2270).

After the distance between the boundary data is reset in step 2270, similarities between the boundary data of the previous image and the following image are founded (step 2280), and corresponding points between the previous image and the following image are extracted by using the found similarities (step 2290).

The hand/eye calibration method according to the present invention extracts corresponding points between the previous image and the following image by using the projective invariant shape descriptor I. Thus, it is possible to accurately perform the hand/eye calibration without being affected by noise or nonlinearity of a camera.

In the present invention, the hand/eye calibration method is applied to the robot hand. However, the hand/eye calibration method can be applied to various kinds of visual servoing devices which control motions of an object by using images obtained through at least one camera.

The present invention may be embodied as a computer readable code in a computer readable medium. The computer readable medium includes all kinds of recording device in which computer readable data are stored. The computer readable medium includes, but not limited to, ROM's, RAM's, CD-ROMs, magnetic tapes, floppy disks, optical data storage device, and carrier waves such as transmissions over the Internet. In addition, the computer readable medium may be distributed to computer systems which are connected via a network, be stored and embodied as the computer readable code.

While the present invention has been particularly shown and described with reference to exemplary embodiments thereof, it will be understood by those of ordinary skill in the art that various transforms in form and details may be made therein without departing from the spirit and scope of the present invention as defined by the following claims.

What is claimed is:

1. A method of extracting corresponding points between images, the method comprising:
    (a) defining errors for a projective invariant shape descriptor for a two-dimensional image from at least two images obtained at a predetermined interval and calculating noisy invariance;
    (b) calculating a threshold to be used to set corresponding points according to the noisy invariance;
    (c) extracting boundary data from the images and presenting the extracted boundary data by subsampling N data;
    (d) minimizing the projective invariant shape descriptor;
    (e) transforming a following image into the previous image according to the minimized projective invariant shape descriptor;
    (f) resetting distance between boundary data in consideration of the ratio of distance between boundary data before the transformation to distance between boundary data after the transformation; and
    (g) finding similarities between the boundary data and extracting corresponding points between the previous image and the following image.

2. The method of claim 1, wherein the errors are defined by using a Gaussian noise model.

3. The method of claim 1, wherein the steps (d) through (f) are repeated until the errors are within a predetermined scope.

4. A computer readable medium having embodied thereon a computer program for executing a method of claim 1.

* * * * *